Figures 1A, 1C:
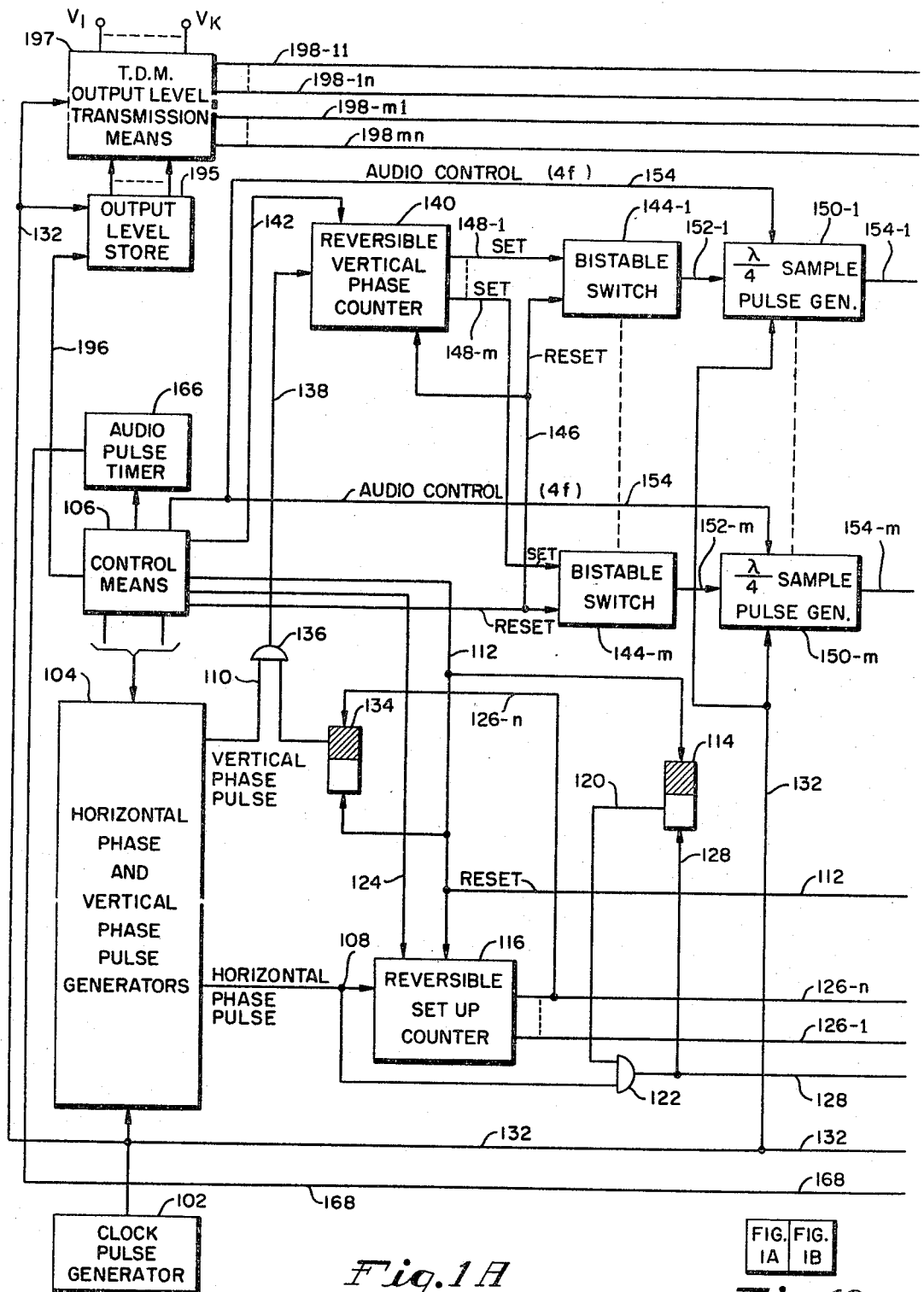

United States Patent Office 3,324,452
Patented June 6, 1967

3,324,452
DIGITAL PHASE CONTROL SYSTEM FOR USE IN PRODUCING A VARIABLE DIRECTION BEAM FROM A FIXED TRANSMITTING ARRAY
Barrie Brightman and Uwe A. Pommerening, Webster, N.Y., assignors to General Dynamics Corporation, Rochester, N.Y., a corporation of Delaware
Continuation of application Ser. No. 413,071, Nov. 23, 1964. This application Oct. 18, 1966, Ser. No. 587,621
18 Claims. (Cl. 340—5)

This is a continuation of application Ser. No. 413,071 filed Nov. 23, 1964, and now abandoned.

This invention relates to a phase control system and, more particularly, to such a system for producing a variable direction beam from a fixed transmitting array.

It is well known that a fixed transmitting array, such as an array composed of a plurality of stationary sonar transducers, may be utilized to transmit a directional beam of energy at any transmitting frequency, the direction of the beam being a function of the relative phase difference of the respective signals of the transmitting frequency applied to the respective transducing elements making up the array.

For instance, if signals having the same frequency and phase are applied to each transducer of a planar array of equally spaced transducers arranged in rows and columns, the array will transmit a broadside beam in a direction perpendicular to the planar array. On the other hand, if the phase of the signal applied to the respective transducers of each column is delayed by a time interval with respect to the phase of the signal applied to the respective transducers of the column immediately to its left which time interval is equal to the distance between adjacent transducers in each row divided by the velocity of propagation of the transmitted energy in the medium surrounding the transducers, an end-fire beam substantially parallel to the planar array will be propagated to the right. Similarly, if this time delay is more than zero, but is less than that necessary to produce an end-fire beam, a beam of energy will be propagated at some azimuth angle in the first quadrant which angle is a function of this time delay. In like manner, if the phase of the signal applied to the transducers of each column is delayed by an appropriate time interval with respect to the phase of the signal applied to the transducers of the column immediately to its right, a beam of energy will be propagated at some azimuth angle in the second quadrant. Just as the azimuth angle may be controlled by controlling the relative time delay between adjacent columns of a planar array, the elevation angle may be controlled by controlling the relative time delay between adjacent rows of a planar array.

The reason that a directional beam is produced is that wave energy transmitted by each of the transducers will algebraically add up to re-enforce each other in a certain direction which depends solely on the positions of the transducers in the array and the relative phase difference existing between signals applied to adjacent transducers. In all other directions, the wave energy transmitted from each of the respective transducers of the array will algebraically add up to cancel each other.

Although in the above discussion it has been assumed that the fixed array is a planar array, this is not necessarily the case. It is possible by properly choosing the positions of the transducers in a non-linear, non-planar array, in a manner to be described in detail below, and by inserting preselected fixed phase delays in the signals applied to the transducers thereof to produce a virtual planar array which is displaced and/or rotated with respect to the actual array. Such a virtual planar array at a predetermined angle with respect to an actual planar array may also be produced by inserting preselected fixed phase delays in the signals applied to the transducers thereof.

Since in most cases it is desirable to produce a directional beam of relatively narrow width, and a beam becomes narrower as the number of transducers in the transmitting array increases, it is often necessary to provide an array consisting of several hundred columns and rows of transducers in order to produce a beam of sufficient directivity. This requires that the minimum phase difference in the signals applied to the transducers of the various columns and rows be quite small, in the order of one degree or less.

It will be appreciated that with ordinary space division techniques it is quite difficult and expensive to provide each one of hundreds of transducers with an sinusoidal signal of a transmitting frequency which is accurately phased to a fraction of one degree for each selected one of a relatively large plurality of different available beam directions. This problem has limited the use of fixed transmitting arrays for producing a variable direction beam.

The present invention contemplates the utilization of time division multiplex techniques and, more particularly, the use of sequentially applied digital pulse codes and digital-to-analog converters to produce the multiplicity of needed sinusoidal signals of different phases. Time division techniques may also be used to distribute the sinusoidal signals to the appropriate transducers for forming a beam in any one of a large plurality of different directions. Furthermore, for proper beam forming the relative levels of sinusoidal signals applied to the various transducers must be controlled. Time division multiplex techniques are also utilized for such level control.

It is therefore an object of the present invention to provide an improved phase control system for producing a variable direction beam from a fixed transmitting array.

It is a further object of the present invention to provide such a phase control system utilizing time division multiplex techniques.

It is a still further object of the present invention to provide such a time division multiplex phase control system incorporating digital-to-analog converters responsive to sequentially applied digital pulse codes for deriving sinusoidal signals of desired frequency and relative phase.

Figure 1B:
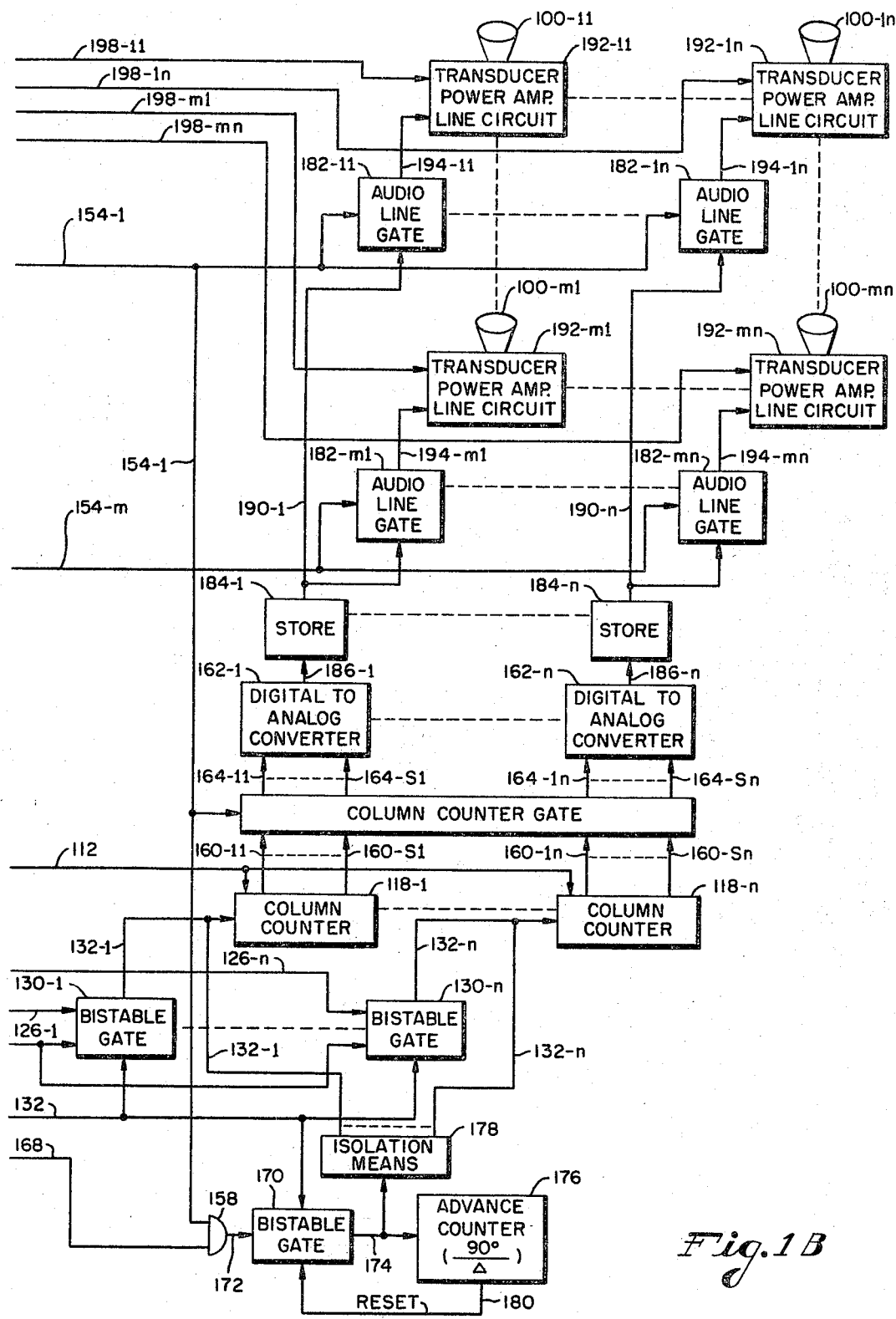
Figure 2A:
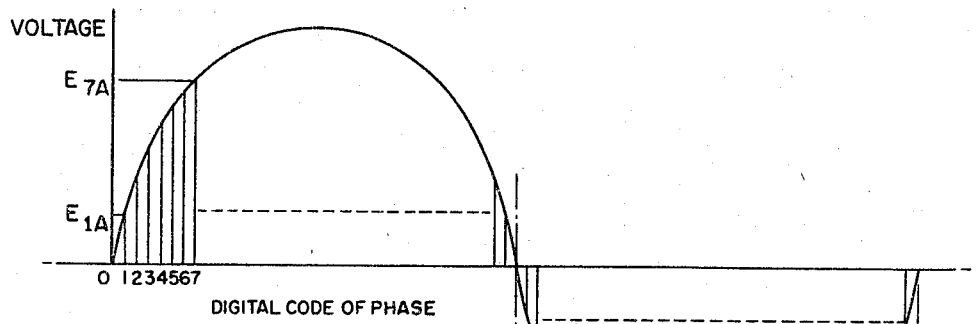
Figure 2B:
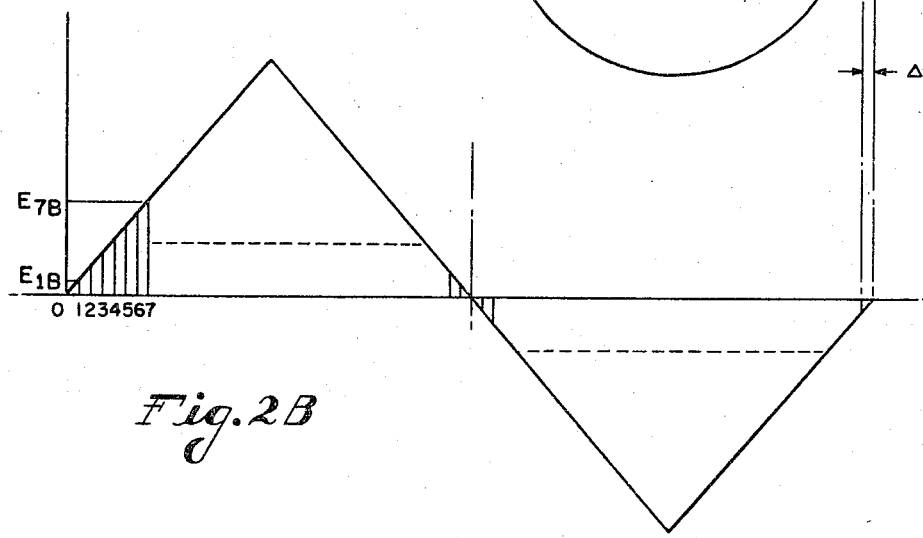
Figure 3:
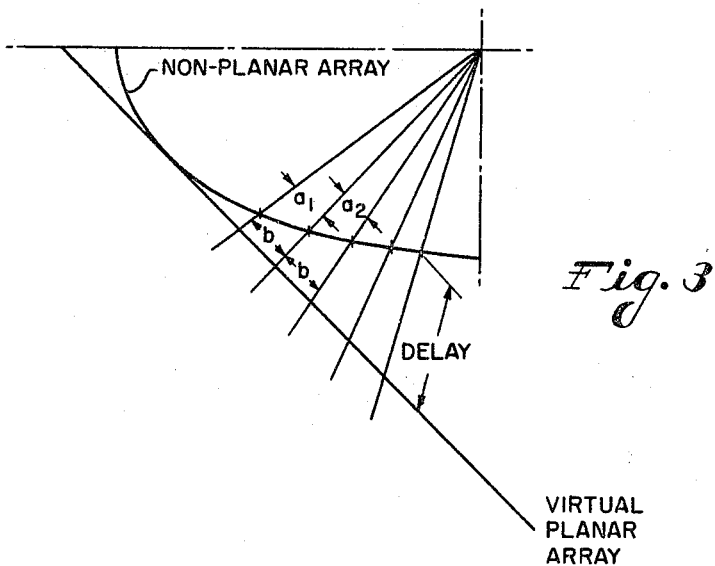

These and other objects, features and advantages of the present invention will become more apparent from the following detailed description, taken together with the accompanying drawings, in which:

FIGS. 1A and 1B, when placed next to each other as shown in FIG. 1C, illustrate a block diagram of a preferred embodiment of the present invention;

FIGS. 2A and 2B are respective diagrams illustrating alternative relationships between the digital codes applied to any of the digital-to-analog converters shown in FIGS. 1A and 1B and the analog outputs therefrom corresponding thereto; and FIG. 3 illustrates the relationships of a non-planar array with a virtual planar array produced therefrom.

Referring to FIGS. 1A and 1B, there is diagrammatically shown a planar array of sonar transducers arranged in $m$ rows and $n$ columns, namely, transducers $100–11 \ldots 100–n; \ldots ; 100–ml \ldots 100–mn$. The spacing between adjacent columns of transducers is equal and the spacing between adjacent rows of transducers is equal, but the column spacing and the row spacing are not necessarily equal to each other.

The phase control system for producing a variable beam direction from this planar array of transducers is synchronized by clock pulses having a very high frequency, such as 15 mc., for instance, from clock pulse generator 102. Horizontal phase and vertical phase pulse generators 104 to which clock pulses are applied may consist of a plurality of clock pulse frequency dividers or a plurality of clock pulse synchronized multivibrators. In any event, control means 106, which either manually and/or automatically supplies all control information, provides horizontal phase and vertical phase pulse generators 104 with beam direction information as to the desired value of the horizontal phase frequency and vertical phase frequency. This information is utilized to either control the tuning of the individual clock pulse synchronized multivibrators or the divisor of the individual frequency dividers, as the case may be, in block 104. In this manner, variable frequency horizontal phase pulses are produced on conductor 108 which have a pulse repetition period which is the exact integral multiple of the clock pulse repetition period, and variable frequency vertical phase pulses are produced on conductor 110 which have a pulse repetition period which is an exact integral multiple of the clock pulse repetition period.

Initially, under the control of control means 106, a reset pulse is applied over conductor 112 as an input to flip-flop 114, reversible setup counter 116, and each of column counters 118–$l$ . . . 118–$n$. The effect thereof is to switch flip-flop 114 to a reset condition thereof and to set reversible setup counter 116 and each of column counters 118–$l$ . . . 118–$n$ to a home position thereof. In the reset condition thereof, flip-flop 114 applies an enabling signal over conductor 120 as a first input to AND gate 122. The horizontal phase pulses on conductor 108 are applied both as an input to reversible set up counter 116 and as a second input to AND gate 122. When a beam direction in the first quadrant is selected by control means 106, control means 106 applies a control signal to reversible set up counter 116 over conductor 124 which results in reversible set up counter 116 counting in a forward direction the horizontal phase pulses applied thereto over conductor 108. When a beam direction in the second quadrant is selected by control means 106, control means 106 applies a control signal to reversible set up counter 116 over conductor 124 which results in reversible set up counter 116 counting in a reverse direction the horizontal phase pulses applied thereto over conductor 108.

When reversible set up counter 116 is counting in a forward direction, an output pulse will be produced thereby in sequence on each individual one of conductors 126–$l$ . . . 126–$n$ in that order in response to each successive horizontal phase pulse applied thereto over conductor 108. When reversible set up counter 116 is counting in a reverse direction, an output pulse will be produced thereby in each sequence on each individual one of conductors 126–$n$ . . . 126–$l$ in that order in response to each successive horizontal phase pulse applied thereto over conductor 108. Since the pulse repetition period of the horizontal phase pulses is variable, the time delay between the application of a pulse to successive ones of conductors 126–$l$ . . . 126–$n$ in a forward or reverse condition, as the case may be, is varied accordingly.

As stated above, the horizontal phase pulses on conductor 108 are also applied as a second input to AND gate 122. When, in response to a reset signal, flip-flop 114 is in its reset condition and applies an enabling signal as a first input to AND gate 122, the first horizontal phase pulse applied as a second input to AND gate 122 will be forwarded to conductor 128. The horizontal phase pulse forwarded to conductor 128 will be applied as a set input to flip-flop 114 to switch flip-flop 114 to its set condition. When flip-flop 114 is switched to its set condition, a disabling signal is applied over conductor 120 as the first input to AND gate 122. Therefore, AND gate 122 will not forward any further horizontal phase pulses applied as a second input thereto to conductor 128 until flip-flop 114 is again switched to its reset condition in response to a succeeding reset pulse applied thereto over conductor 112. Therefore, AND gate 122 will pass only a single horizontal phase pulse.

This single horizontal phase pulse passed by AND gate 122 and forwarded to conductor 128, in addition to being applied as a set input to flip-flop 114, is also applied over conductor 128 as a first input to each of bistable gates 130–$l$ . . . 130–$n$. Clock pulses from clock pulse generator 102 are applied in common over conductor 132 as a second input to all of bistable gates 130–$l$ . . . 130–$n$ Individual ones of conductors 126–$l$ . . . 126–$n$, emanating from reversible set up counter 116, are applied as third inputs to corresponding ones of bistable gates 130–$l$ . . . 130–$n$, as shown.

Each of bistable gates 130–$l$ . . . 130–$n$ consists of a flip-flop and an AND gate. The flip-flop of each of bistable gates 130–$l$ . . . 130–$n$ is set by the pulse applied as a first input thereto over conductor 128 and is reset in response to the pulse applied as a third input thereto over the corresponding one of conductors 126–$l$ . . . 126–$n$ When the flip-flop of each of bistable gates 130–$l$ . . . 130–$n$ is switched to its set condition, it enables the AND gate thereof; and when the flip-flop of each of bistable gates 130–$l$ . . . 130–$n$ is switched to its reset condition, it disables the AND gate thereof. The clock pulses applied as a second input to each of bistable gates 130–$l$ . . . 130–$n$ are forwarded by the AND gate thereof only when it is enabled to the corresponding one of conductors 132–$l$ . . . 132–$n$ emanating therefrom. The clock pulses forwarded to each of conductors 132–$l$ . . . 132–$n$ are applied as an input to the corresponding one of column counters 118–$l$ . . . 118–$n$ to advance the count registered in each column counter by one in response to each clock pulse applied thereto. Each of column counters 118–$l$ . . . 118–$n$ is a cyclic counter having a relatively high predetermined count capacity, such as over 2,000, for instance.

From the foregoing it will be seen that all of bistable gates 130–$l$ . . . 130–$n$ are opened simultaneously, but are sequentially closed. In particular, if reversible set up counter 116 is counting in the forward direction, bistable gate 130–$l$ is closed first and bistable gate 130–$n$ is closed last. On the other hand, if reversible set up counter 116 is counting in the reverse direction, bistable gate 130–$n$ will be closed first and bistable gate 130–$l$ will be closed last. The number of clock pulses applied to any one of column counters 118–$l$ . . . 118–$n$ is, of course, determined by the time interval between the opening and closing of the bistable gate corresponding therewith. It will be seen that there will be a time delay between the closing of adjacent bistable gates equal to a single horizontal phase pulse repetition period. Although the horizontal phase pulse period is variable, it is always equal to an integral multiple of the clock pulse period. Therefore, after all the bistable gates have been closed by the outputs from reversible set up counter 116, each of column counters 118–$l$ . . . 118–$n$ will have a different count register therein, the difference in counts registered by two adjacent ones of column counters 118–$l$ . . . 118–$n$ being equal to the number of clock pulse periods contained in a single horizontal phase pulse period.

The application of an output from reversible set up counter 116 to counter 126–$n$, in addition to resetting the flip-flop of bistable gate 130–*n*, also is effective in setting flip-flop 134. This results in flip-flop 134 applying an enabling signal as a first input to AND gate 136, which, it should be seen, only happens after column counters 118–*l* . . . 118–*n* have been completely set up. The enabling of AND gate 136 permits the vertical phase pulses on conductor 110 which are applied as a second input to AND gate 136 to be forwarded over conductor 138 as an input to reversible vertical phase counter 140.

When a beam direction in the first quadrant is selected by control means 106, control means 106 applies a control signal to reversible vertical phase counter 140 over conductor 142 which results in reversible vertical phase counter 140 counting in a forward direction the vertical phase pulses forwarded thereto over conductor 138. When a beam direction in the second quadrant is selected by conrtol means 106, control means 106 applies a control signal to reversible vertical phase counter 140 over conductor 142 which results in reversible vertical phase counter 142 counting in a reverse direction the vertical phase pulses forwarded thereto over conductor 138.

Initially, reversible vertical phase counter 140 is in a home position thereof and each of bistable switches 144–*l* . . . 144–*n*, each of which may be a flip-flop, is in a reset condition thereof in response to a reset pulse which has previously been applied thereto under the control of control means 106 over conductor 146.

When reversible phase counter 140 is counting in a forward direction, an output pulse will be produced thereby in sequence on each individual one of conductors 148–*l* . . . 148–*m* in that order in response to each succesive vertical phase pulse forwarded thereto over conductor 138. When reversible vertical phase counter 140 is counting in a reverse direction, an output pulse will be produced thereby in sequence on each individual one of conductors 148–*m* . . . 148–*l* in that order in response to each successive vertical phase pulse forwarded thereto over conductor 138. Since the pulse repetition period of the vertical phase pulses is variable, the time delay between the application of a pulse to successive ones of conductors 148–*l* . . . 148–*m* in a forward or reverse direction, as the case may be, is varied accordingly.

Each of bistable switches 144–*l* . . . 144–*m*, which as previously stated is initially in a reset condition, is switched to a set condition thereof in response to an output from reversible vertical phase counter 140 on the corresponding one of conductors 148–*l* . . . 148–*m*. Each of bistable switches 144–*l* . . . 144–*m*, when in a reset condition, is effective in maintaining the corresponding one of λ/4 sample pulse generators 150–*l* . . . 150–*m*, which is coupled thereto over the corresponding one of individual conductors 152–*l* . . . 152–*m*, disabled, and when in a set condition is effective in maintaining the corresponding one of λ/4 sample pulse generators 150–*l* . . . 150–*m* enabled.

Each of λ/4 sample pulse generators 150–*l* . . . 150–*m*, which may be a variable frequency clock pulse synchronized multivibrator, has an audio control signal applied in common thereto from control means 106 over conductor 154 and has clock pulses applied thereto in common over conductor 132. Each of λ/4 sample pulse generators 150–*l* . . . 150–*m*, under the control of the audio signal applied thereto from control means 106 over conductor 154, when enabled, produces as an output a series of pulses having a pulse repetition period equal to four times the desired audio frequency. However, the relative phase of the various ones of λ/4 sample pulse generators 150–*l* . . . 150–*m*, which depends on the respective instance at which the individual ones of sample pulse generators were enabled, are different from each other. More particularly, the time delay or relative phase difference between the output pulses produced by adjacent ones of λ/4 sample pulse generators 150–*l* . . . 150–*m* on corresponding ones of individual conductors 154–*l* . . . 154–*m* will be equal to a single vertical phase pulse repetition period.

The output from any single one of λ/4 sample pulse generators 150–*l* . . . 150–*m*, for instance, as shown in FIGS. 1A and 1B sample generator 150–*l*, is applied over the corresponding conductor, for example conductor 154–*l*, as an enabling input to column counter gate 156 and as a first input to AND gate 158.

Preferably, each of column counters 118–*l* . . . 118–*n* is composed of S stages of cascaded flip-flops, S having a value such that $2^S$ is equal to the count capacity of the counter. Emanating from each stage of each of column counters 118–*l* . . . 118–*n* is an individual conductor, namely, conductors 160–*ll* . . . 160–S*l*, emanating from column counters 118–*l*; . . .; and conductors 160–*ln* . . . 160–S*n* emanating from column counter 118–*n*. In accordance with the count being manifested by each of column counters 118–*l* . . . 118–*n*, binary coded mark signals are applied to a unique combination of certain individual ones of the corresponding S conductors emanating from that column counter; i.e., the unique combination of mark signals applied to certain ones of conductors 160–*ll* . . . 160–S*l* manifests the count then registered in column counter 118–*l*; . . .; and the unique combination of mark signals applied to certain ones of conductors 160–*ln* . . . 160–S*n* manifests the count then registered in column counter 118–*n*.

As shown, each of the conductors 160–*ll* . . . 160–S*l*; . . .; and 160–*ln* . . . 160–S*n* is applied as an individual input to column counter gate 156. Column counter gate 156 includes an individual normally closed AND gate associated with each of these conductors, all of which are simultaneously opened in response to the pulse applied to column counter gate 156 from λ/4 sample pulse generator 150–*l* over conductor 154–*l*. This results in the count manifested by each of column counters 118–*l* . . . 118–*n* being sampled at this time and forwarded to the corresponding one of digital-to-analog converters 162–*l* . . . 162–*n* over conductors 164–*ll* . . . 164–S*l*; . . .; and 164–*ln*. . . 164–S*n* corresponding, respectively, with each of conductors 160–*ll* . . . 160–S*l*; . . .; and 160–*ln* . . . 160–S*n*. Each of digital-to-analog converters 162–*l* . . . 162–*n* is pre-programmed to produce a predetermined analog voltage level which depends solely on the count manifested by the unique combination of mark signals applied thereto.

More particularly, as shown in FIG. 2A, each count represents a digital code of equal increments, Δ, of the phase angle of a sinusoidal wave. If, for purely illustrative purposes, it is assumed that Δ repersents 0.18°, there will be 2,000 increments in a full sine wave of 360°. In this case, the count capacity of each of column counters 160–*ll* will be 2,000, so that 2,000 different combinations of binary coded mark signals may be applied as an input to any of digital-to-analog converters 162–*l* . . . 162–*n*. The pre-programming of each digital-to-analog converter, in this case, will be such that this digital-to-analog converter will derive as an output a voltage level proportional to the sine of the product 0.18° multiplied by the count manifested by the combination of binary coded mark signals applied as an input thereto. Thus, for example, in response to a count manifesting one being applied to any digital-to-analog converter, that digital-to-analog converter will produce an output voltage, $E_{1A}$, proportional to sin 0.18°; and in response to a count manifesting seven being applied to any digital-to-analog converter, that digital-to-analog converter will produce an output voltage, $E_{7A}$, proportional to sin 1.26°, 1.26 being equal to seven times 0.18.

It will therefore be seen that each pulse from λ/4 sample pulse generator 150–*l* applied to column counter gate 156 over conductor 154–*l* results in each of digital-to-analog converters 162–*l* . . . 162–*n* sampling the count then registered in the corresponding one of column counters 118–l ... 118–n to thereby produce a voltage output in accordance with the sampled count which is proportional to a particular instantaneous amplitude of a sinusoidal wave which is determined by the sampled count.

It is not essential that the pre-programming of the respective digital-to-analog converters be exactly a sine wave, as shown in FIG. 2A. The only thing that is necessary is that the respective digital-to-analog converters be pre-programmed in accordance with a periodic waveform having a fundamental frequency equal to that of the sine wave shown in FIG. 2A, wherein the instantaneous amplitude is a single-valued function of the instantaneous phase, such as, for instance, the triangular wave shown in FIG. 2B. The reason for this is that, as will be described in more detail below, successive amplitude sample pulses of the waveform produced by a digital-to-analog converter are applied to the input of a low-pass filter which only passes the fundamental frequency component of the successive amplitude sample pulses applied thereto. Therefore, the output of the low-pass filter will be a sinusoidal wave regardless of whether the pre-programming of the respective digital-to-analog converters is in accordance with the waveform of FIG. 2A or the waveform of FIG. 2B, as the case may be.

As previously mentioned, each pulse from λ/4 sample pulse generator 150–l is also applied as a first input to AND gate 158 over conductor 154–l. Audio pulse timer 166, under the control of control means 106, applies an enabling signal as a second input to AND gate 158 over conductor 168 only during intermittent transmitting periods, each of which may be in the order of seconds. Each transmitting period, under the control of audio pulse timer 166, is followed by a receiving period, which also may be in the order of seconds during which a disabling signal is applied as the second input to AND gate 158. Therefore, only during each transmitting period, in response to each pulse from λ/4 sample pulse generator 150–l, AND gate 158 will forward a set pulse to bistable gate 170 over conductor 172. This will be effective in setting a flip-flop included in bistable gate 170. The setting of this flip-flop will result in clock pulses applied to bistable gate 170 from clock pulse generator 102 over conductor 132 being forwarded through an AND gate included in bistable gate 170, which AND gate is enabled only in response to the flip-flop included in bistable gate 170 being in its set condition, to conductor 174. The forwarded clock pulses, as shown, are applied over conductor 174 as an input to both advance counter 176 and isolation means 178. Advance counter 176 is a cyclic counter having a count capacity equal to 90° divided by Δ. For instance, in the assumed case where Δ is equal to 0.18°, advance counter 176 will have a count capacity of 500. Each clock pulse forwarded over conductor 174 from bistable gate 170 to advance counter 176 is effective in advancing the count of advance counter 176 by a count of one. Therefore, in the assumed case, it will take 500 clock pulses to advance counter 176 through one complete cycle thereof. In response to advance counter 176 counting the 500th pulse applied thereto, a reset pulse is applied therefrom over conductor 180 to bistable gate 170 to effect the resetting of the flip-flop thereof, resulting in no further clock pulses being applied to advance counter 176.

Each of the 500 pulses applied as an input to advance counter 176 over conductor 174 is also applied through isolation means 178, which may consist of n individual diodes, as a counting input to each of column counters 118–l ... 118–n over corresponding ones of individual conductors 132–l ... 132–n emanating from isolation means 178. Therefore the count manifested by each of column counters 118–l ... 118–n, in the assumed case, is advanced by 500, or, in the general case, will be advanced by 90°/Δ. When column counters 118–l ... 118–n are again sampled in response to the next pulse appearing on conductor 154–l, each of digital-to-analog converters 162–l ... 162–n, when pre-programmed in accordance with FIG. 2A, will produce an output analog voltage which is proportional to the sine of an angle 90° greater than the angle represented by the immediately preceding sample.

It will be seen that a complete sinusoidal wave is manifested by four successive samples, regardless of whether digital-to-analog converters 162–l ... 162–n are preprogrammed in accordance with FIG. 2A or FIG. 2B. Further, the frequency of the sinusoidal wave is dependent solely on the frequency of the sample pulse generator, which is controlled by the audio control signal on conductor 154, and the relative phase of the sinusoidal wave manifested by the four successive samples depends solely upon the original count entered into each of column counters 118–l ... 118–n by reversible setup counter 116. The reason for obtaining four samples of each wave is in order to comply with the requirements of Nyquist's sampling theorem.

As shown, the output pulses from λ/4 sample pulse generator 150–l are also applied in common over conductor 154–l as an input to all of normally closed audio line gates 182–ll ... 182–ln to effect the opening thereof in response to each pulse therefrom. In a similar manner, output pulses from each of the other sample pulse generators, i.e., sample pulse generator 150–2 (not shown) ... 150–m, are applied in common over corresponding ones of conductors 154–2 (not shown) ... 154–m as an input to all the normally closed audio line gates corresponding to the row with which that sample pulse generator is associated, i.e., pulses from sample pulse generator 150–2 (not shown) are applied to audio line gates 182–2l ... 182–2n (not shown); ... ; and pulses from sample pulse generator 150–m are applied to audio line gates 182–ml ... 182–mn to effect the opening thereof in response to each pulse therefrom.

The output of each digital-to-analog converters 162–l ... 162–n is applied to the corresponding one of stores 184–ll ... 184–n over corresponding ones of individual conductors 186–l ... 186–n.

Each of stores 184–l ... 184–n registers the level of the digital-to-analog converter output sample applied thereto for an entire time frame period until the next sample is applied thereto. Each of stores 184–l ... 184–n may consist of a capacitance, which is charged by the output sample applied thereto, feeding the input of a cathode follower or emitter follower. Since, as is well known in the art, a cathode follower or emitter follower has a very high input impedance, no appreciable discharge of the capacitance will take place during the single time frame period which exists between the application of successive samples thereto. Therefore, during the entire time frame period, the relatively low impedance output of the cathode follower or emitter follower will be maintained at a magnitude which is proportional to the magnitude of the output sample then being stored by the capacitance of that store.

The output of each of stores 184–l ... 184–n is applied in common as an input to all the audio line gates corresponding with the column with which it is associated, i.e., the output of stores 184–l is applied in common as an input to normally closed audio line gates 182–ll ... 182–ml over conductor 190–l; ... ; and the output of store 184–n is applied in common as an input to normally closed store output gates 182–ln ... 182–mn over conductor 190–n.

As shown in FIGS. 1A and 1B, the output of each audio line gate is applied as an input to the corresponding one of transducer, power amplifier, line circuits, i.e., the outputs of store output gates 182–ll ... 182–ln are applied, respectively, as inputs to transducer, power amplifier, line circuits 192–ll ... 192–ln over corresponding conductors 194–ll ... 194–ln; ... ; and the outputs of store output gates 192–ml ... 192–mn are applied, respectively, as inputs to transducer, power amplifier, line circuits 194–*ll* . . . 194–*ln* over corresponding conductors 194–*ml* . . . 194–*mn*.

Each transducer, power amplifier, line circuit includes a low-pass filter for reconstructing the sample into a sinusoidal wave having a phase which depends both on the phase of the wave emanating from that one of the digital-to-analog converters 162–*l* . . . 162–*n* associated with the column with which it is associated and the vertical time delay experienced by that sample pulse generator corresponding to the row with which it is associated. This reconstructed sinusoidal wave is amplified by the power amplifier included in each transducer, power amplifier, line circuit and then is converted from electrical energy into sonic energy by the transducer included in each transducer, power amplifier, line circuit to cause the associated transducer to transmit a sonic wave having the same frequency and phase.

It will be seen that although in the embodiment shown in FIGS. 1A and 1B the column counters 118–*l* . . . 118–*n* correspond with each column of transducers and the sample pulse generators 150–*l* . . . 150–*m* correspond with each row of transducers, it is possible to modify the embodiment shown in FIGS. 1A and 1B to provide a row counter corresponding with each row of transducers and a sample pulse generator corresponding with each column of transducers. Of course, in this case, the output of reversible setup counter 116 would feed the sample pulse generators associated with each column and reversible vertical phase counter 140 would feed the row counter associated with each row.

In this manner that has been described up to now, signals having the desired audio frequency in proper relative phase in accordance with desired beam direction are applied to each of the transducer, power amplifier, line circuits.

However, it is also necessary to control the relative amplitude of each audio signal to be transmitted by each transducer in accordance with the selected beam directoin. This may be accomplished in the same manner as described in detail in the copending application (D–3004) entitled, "Delay Counter Phase Control System for use in Producing a Variable Direction Beam from a Fixed Transmitting Array," by Uwe A. Pommerening, Ser. No. 412,956, filed Nov. 23, 1964, now abandoned, and assigned to the same assignee as the present invention. Briefly, this is accomplished, as shown in FIGS. 1A and 1B, by providing output level store 195, which may be a pre-programmed multichannel magnetic drum or core store, for instance, which obtains information as to the desired beam direction from control means 106 over conductor 196 which is synchronized by clock pulses over conductor 132, and by providing conventional time division multiplex output level transmission means 197 (the details of which are shown in said copending application), which includes means for generating a repetitive time frame each including *n* time slots, from the clock pulses applied thereto. Output level store 195 in accordance with its program and the beam direction information received thereby provides, during each time slot of each time frame, a control pulse for opening some one of *k* normally closed level gates included in block 197, and more fully described in said copending application, associated with each row of transducers. Each level gate associated with any one row, when opened, applies a distinct one of *k* different voltage levels, V*l* . . . V*k*, to a common transmission highway (included within block 197 and more fully described in said copending application) corresponding to that row.

During each time frame the successive time slot pulses are effective in seqeuntially opening line gates individually associated with the transducer, power amplifier, line circuits of each row (which are included in block 197 and are more fully described in said copending application), so as to apply the selected ones of voltage V*l* . . . V*k* for each row as an input to the appropriate one of the transducer, power amplifier, line circuits of that row in accordance with conventional time division multiplex techniques, i.e., over conductors 198–*ll* . . . 198–*ln* associated with the top row; . . . ; and over conductors 198–*ml* . . . 198–*mn* associated with the bottom row.

As more fully described in said copending application, each of the transducer, power amplifier, line circuits includes a rectifier for providing a D.C. voltage which has a magnitude proportional to that one of voltages V*l* . . . V*k* then being applied thereto. This D.C. voltage derived in each transducer, power amplifier, line circuit is utilized to control the gain of the power amplifier thereof, so that the amplitude of the sinusoidal wave being transmitted is controlled thereby.

The basic preferred embodiment shown in FIGS. 1A and 1B is for use with a physically planar array. At times the actual physical array is not planar but has some other shape, such as elliptical, for instance. As shown in FIG. 3, a virtual planar array, wherein the effective distance "*b*" between adjacent transducers on the virtual planar array is equal, may be derived from an actual non-planar array by locating the physical transducers of the non-planar array at unequal distances "$a_1, a_2$ . . . " from each other and providing an appropriate fixed delay for each transducer. More particularly, as shown in FIG. 3, the distances "$a_1, a_2$ . . . " may be determined by choosing a line in accordance with the desired location of the virtual planar array, laying out equidistant points on this line, the distance between adjacent points being "*b*," drawing straight lines between these points and the origin of the non-planar array, and locating the transducers at the intersection of these straight lines and the non-planar array. The distance between the position of a transducer on the non-planar array and the point corresponding thereto on the virtual planar array manifests a fixed time delay which is equal to this distance divided by time velocity of sound in the surrounding medium.

The embodiment shown in FIGS. 1A and 1B may be easily modified to provide this needed fixed delay for each transducer merely by resetting each one of column counters 118–*l* . . . 118–*n*, in response to the reset pulse on conductor 112 applied thereto, to an individual preset count, rather than to a home position thereof as previously described for the embodiment shown in FIGS. 1A and 1B, for each of the column counters 118–*l* . . . 118–*n*. The preset count for each one of column counters 118–*l* . . . 118–*n* is determined in accordance with the needed fixed delay for the hydrophone which corresponds with that column counter.

An alternative way of modifying the embodiment shown in FIGS. 1A and 1B to provide this needed fixed delay for each transducer would be to alter the pre-programmed relationship between the value of the count applied to each respective one of digital-to-analog converters 162–*l* . . . 162–*n* and the analog voltage level appearing at the output thereof so as to add a predetermined fixed angle individual thereto. More particularly, for instance, if one of the digital-to-analog converters is pre-programmed in accordance with FIG. 2A, the digital-to-analog converter adjacent to this one is pre-programmed such that a voltage level equal to $E_{1A}$ is produced in response to a count of 2 rather than 1 . . . and a voltage level $E_{7A}$ is produced in response to a count of 8 instead of 7, et cetera, a predetermined delay equal to $\Delta$ will be introduced between the output waves produced by these two digital-to-analog converters. Thus by suitably pre-programming each respective digital-to-analog converter, the needed fixed delay for each can be obtained.

Even when the physical array is planar, under certain conditions it may be desirable to use fixed delays to produce a virtual planar array at some fixed angle, such as 45°, with respect to the physical planar array. This is because steering steps are relatively crude toward end-fire with respect to steering steps closer to broadside of the array. For instance, with a 15 mc. clock, it is possible to obtain steering steps of approximately 0.2° when the angle of the planar array and the direction of the beam is between 30° and 45°; while if this angle is less than 10°, the smallest steering steps obtainable is greater than 0.5°. By providing a virtual array at 45° with respect to the physical array, a substantially end-fire beam makes an angle of close to 45° with respect to the virtual array, rather than the angle of close to 0° which it makes with respect to the physical array.

Although for illustrative purposes, only certain basic embodiments of the present invention have been shown. It is realized that it is within the skill of the art to add various subsidiary features, such as frequency modulation of the audio square wave by varying the frequency of the audio square wave under the control of control means 106, amplitude modulation of the audio wave by refinement of output level store 126 so that theoutput level is not only a function of beam direction but is a function of an applied modulation frequency, any of which may be desirable in a sophisticated sonar system. Therefore, it is intended that the present invention not be restricted to the specific embodiment disclosed, but that it be limited only by the true spirit and scope of the appended claims.

What is claimed is:

1. A phase control system for a fixed transmitting array composed of a plurality of individual transducers, said system comprising a group of cyclical counter means each having the same predetermined count capacity; first means for initially registering in each counter means a preselected count individual thereto, timing means for generating a timing signal having a given frequency; second means under the control of said timing means for periodically adding at said given frequency to the count registered in each counter means an additional count equal to one-quarter of said predetermined count capacity; a group of programmed digital-to-analog converters each of which corresponds to an individual one of said counter means, each of said digital-to-analog converters being programmed in accordance with a single period of the same predetermined waveform function, said predetermined waveform function having a substantial fundamental component thereof which is sinusoidal and having an instantaneous amplitude which is a single-valued function of the instantaneous angle thereof, each of said digital-to-analog converters being responsive to the value of a count applied thereto for producing an output signal level equal in magnitude to that instantaneous amplitude of said waveform function which corresponds to an angle of said waveform function which is a linear function of the ratio of the value of said applied count to the value of said predetermined count capacity; third means under the control of said timing means for sampling each counter means at said given frequency and applying the count then registered in each counter means to that one of said digital-to-analog converters corresponding thereto; an individual line circuit including a low-pass filter for passing a frequency equal to one-quarter of said given frequency coupled to each transducer; and fourth means for coupling the low-pass filter of each line circuit to a predetermined single one of said digital-to-analog converters for applying the output signal level thereof thereto, whereby a sinusoidal wave is applied to each transducer through the low-pass filter of the line circuit coupled thereto having a frequency equal to one-quarter said given frequency and a relative phase depending on the preslected count initially registered in that counter means with which that digital-to-analog converter coupled to that transducer corresponds.

2. The phase control system defined in claim 1, wherein said linear function of said angle is equal to two pi multiplied by said ratio.

3. The phase control system defined in claim 1, wherein said individual transducers of said transmitting array are arrranged two-dimensionally in a first number of rows and a second number of columns, said group of counter means and corresponding group of digital-to-analog converters each being equal in number to one of said first and second numbers, said timing means including a group of pulse generators equal in number to the other of said first and second numbers, each of said pulse generators generating pulses at said given frequency but at different relative phases from each other, said fourth means including a store corresponding to each digital-to-analog converter for storing the output level produced in response to each sampling of the counter means with which it corresponds, and individual group of normally closed line gates corresponding to each store equal in number to said other of said first and second numbers, whereby each line gate in each respective group thereof corresponds with a different one of said pulse generators, each line gate coupling the store with which it corresponds to a separate line circuit, and means for closing said line gates corresponding to each respective pulse generator in response to each pulse therefrom, said second means being controlled by pulses from one of said pulse generators, and said third means being controlled by pulses from one of said pulse generators.

4. The system defined in claim 3, wherein said first means includes a clock pulse source for generating clock pulses having a first predetermined pulse repetition period, means for generating first control pulses having a first preselected pulse repetition period which is an integral multiple of said predetermined period, individual normally disabled clock pulse applying means corresponding to each counter means effective when enabled to apply clock pulses to be counted to the input of the counter means with which it corresponds, means for enabling all said clock pulse applying means in response to a first occurring one of said first control pulses, and first control pulse set up steering counter means for sequentially disabling each of said clock pulse applying means in response to each of successive ones of said first control pulses occurring subsequent to said first occuring one of said first control pulses.

5. The system defined in claim 4, wherein each of said group of pulse generators is normally disabled, and wherein said timing means further includes means for generating second control pulses having a second preselected pulse repetition period which is an integral multiple of said predetermined period, and a second control pulse steering counter coupled to said first control pulse set up steering counter for sequentially enabling each of said group of pulse generators in response to each of successive ones of said second control pulses occurring subsequent to the completion of set up by said first control pulse set up steering counter, each of said pulse generators when enabled being synchronized by clock pulses applied thereto, whereby the reciprocal of said given frequency is an integral multiple of said predetermined period.

6. The system defined in claim 5, further comprising control means for selecting said first preselected repetition period of said first control pulses and said second preselected repetition period of said second control pulses in accordance with the desired angular direction of a beam to be transmitted from said array.

7. The system defined in claim 6, including level determining means coupled to said control means for controlling the relative amplitudes of the respective sinusoidal waves applied to the respective transducers in accordance with said desired angular direction.

8. The system defined in claim 7, wherein said level determining means includes a plurality of separate points of different fixed potential, time division multiplex means including an output level store controlled by said control means for coupling said line circuits respectively to selected one of said separate points in accordance with said desired angular direction, and power supply means within each line circuit responsive to the value of the fixed potential of the selected point coupled to that line circuit circuit for controlling the amplitude of the sinusoidal wave emanating from that line circuit in accordance therewith.

9. The system defined in claim 5, wherein said first control pulse set up steering counter means is a reversible counter, and means coupling said first control pulse steering set up counter means to said control means for effecting counting in a forward direction when said desired angular direction lies in the first azimuth quadrant and for effecting counting in a reverse direction when said desired angular direction lies in the second azimuth quadrant.

10. The system defined in claim 5, wherein said second control pulse steering counter means is a reversible counter, and means coupling said second control pulse steering counter means to said control means for effecting counting in a forward direction when said desired angular direction lies in the first elevation quadrant and for effecting counting in a reverse direction when said desired angular direction lies in the fourth elevation quadrant.

11. The system defined in claim 5, wherein said array is linear in at least one dimension, and including virtual plane producing means for producing a virtual plane displaced from said array composed of an individual point in said virtual plane corresponding to each transducer in said array wherein adjacent points in each row are equally spaced from each other and adjacent points in each column are equally spaced from each other and adjacent points in each column are equally spaced from each other said virtual plane producing means comprising means in said first means for resetting each of said cyclical counter means to a predetermined count individual thereto prior to the application of clock pulses thereto, whereby the phase of the sinusoidal wave applied to each transducer depends on the value of the predetermined count of that cyclical counter means with which that digital-to-analog converter coupled to that transducer corresponds, the relative values of said respective predetermined counts being such as to shift the respective relative phases of the respective sinusoidal waves dependent thereon by a time delay which is equal to the displacement of the points in said virtual plane coresponding to those transducers from those transducers divided by the velocity of propagation of transmitted energy in the medium surrounding said array.

12. The system defined in claim 11, wherein said array is non-planar and wherein each transducer of said array is positioned at the intersection of said array with a line connecting the point of said virtual plane corresponding to that transducer with a common point on the other side of said array from said virtual plane.

13. The system defined in claim 3, wherein said array is linear in at least one dimension, and including virtual plane producing means for producing a virtual plane displaced from said array composed of an individual point in said virtual plane corresponding to each transducer in said array wherein adjacent points in each row are equally spaced from each other and adjacent points in each column are equally spaced from each other, said virtual plane producing means comprising means for programming said linear function of each digital-to-analog converter with a predetermined constant term individual thereto, whereby the phase of the sinusoidal wave applied to each transducer depends on the value of the predetermined constant term of the linear function program of that digital-to-analog converter coupled to that transducer, the relative values of said respective predetermined constant term being such as to shift the respective relative phases of the respective sinusoidal waves dependent thereon by a time delay which is equal to the displacement of the points in said virtual plane corresponding to those transducers from those transducers divided by the velocity of propagation of transmitted energy in the medium surrounding said array.

14. The system defined in claim 13, wherein said array is non-planar, and wherein each transducer of said array is positioned at the intersection of said array with a line connecting the point of said virtual plane corresponding to that transducer with a common point on the other side of said array from said virtual plane.

15. The system defined in claim 3, wherein said array is a planar array with adjacent transducers in each row being equally spaced from each other and with adjacent transducers in each column being equally spaced from each other.

16. The system defined in claim 1, further including an audio pulse timer means coupled to said second means to render said second means effective solely during intermittent transmitting time periods, the initiation and length of said transmitting time periods being controlled by said timer means.

17. A phase control system for a fixed transmitting array including a plurality of individual transducers, said system comprising
  (a) a group of cyclical counter means,
  (b) means for initially registering in each counter means a preselected count individual thereto,
  (c) a group of programmed digital-to-analog converters each of which corresponds to an individual one of said counter means, each of said digital-to-analog converters being responsive to the value of a count applied thereto for producing an output signal level,
  (d) means for sampling each counter means and applying the count then registered therein to that one of said digital-to-analog converters corresponding thereto,
  (e) an individual line circuit coupled to each transducer, and
  (f) means for coupling said line circuits to an allocated one of said digital-to-analog converters for applying the output signal level thereof thereto, whereby a sinusoidal wave is applied to each transducer through the line circuit coupled thereto, said wave having a relative phase depending on the preselected count initially registered in that counter means with which that digital-to-analog converter coupled to that transducer corresponds.

18. The invention as set forth in claim 17, wherein
  (a) each of said counter means have the same predetermined count capacity,
  (b) each of said digital-to-analog converters being programmed in accordance with a single period of the same predetermined waveform function, said predetermined waveform function having a substantial fundamental component thereof which is sinusoidal and having an instantaneous amplitude which is a single-valued function of the instantaneous angle thereof, and wherein
  (c) said output signal level is equal in magnitude to that instantaneous amplitude of said waveform function which corresponds to an angle of said waveform function which is a linear function of the ratio of the value of said applied count to the value of said predetermined count capacity.

No references cited.

RODNEY D. BENNETT, *Primary Examiner.*

R. A. FARLEY, *Assistant Examiner.*